United States Patent [19]

Kneifel, II

[11] Patent Number: 5,072,359
[45] Date of Patent: Dec. 10, 1991

[54] SPATIALLY-CLOCKED DIGITAL STEERING SERVO FOR TAPE-LAYING MACHINE

[75] Inventor: R. William Kneifel, II, Cincinnati, Ohio

[73] Assignee: Cincinnati Milacron Inc., Cincinnati, Ohio

[21] Appl. No.: 508,447

[22] Filed: Apr. 13, 1990

[51] Int. Cl.$^5$ .............................................. G05B 19/10
[52] U.S. Cl. .............................. 364/167.01; 156/574; 156/361; 226/21
[58] Field of Search ....................... 156/523, 574, 361; 226/15, 16, 17, 18, 19, 20, 21, 22, 23; 364/167.01, 179

[56] References Cited

U.S. PATENT DOCUMENTS

| | | | |
|---|---|---|---|
| 4,696,707 | 9/1987 | Lewis et al. | 156/574 |
| 4,799,981 | 1/1989 | Stone et al. | 156/523 |
| 4,981,545 | 1/1991 | Shinno et al. | 156/574 |

Primary Examiner—Jerry Smith
Assistant Examiner—Patrick D. Muir
Attorney, Agent, or Firm—John W. Gregg

[57] ABSTRACT

A spatially-clocked system in a program controlled tape layer corrects for tape displacement error by rotating the tape application member after a predetermined length of tape is applied rather than on a temporal basis. An interpolator is provided to determine spatial clock period displacement in a temporally-clocked control system.

20 Claims, 9 Drawing Sheets

SPATIALLY-CLOCKED DIGITAL STEERING SERVO FOR TAPE-LAYING MACHINE

BACKGROUND OF THE INVENTION

1. Field of the Invention

This invention relates to control of a computerized tape-laying machine for applying a course of composite tape along a machine path, and more particularly to such control in which displacement of the tape from the machine path is minimized by rotating the tape applicator head relative the path in a direction to offset the displacement.

2. Description of the Prior Art

By way of background, a computerized tape-laying machine includes a tape dispensing head positionable and movable in multiple axes under computer control relative to a layup tool or the like so as to apply multiple courses or strips of composite tape material to the layup tool and form thereon parts such as aircraft wings, for example. Typically, the tape head is mounted to a gantry/carriage assembly which moves in a plane to cause the head to move back and forth and side-to-side relative the layup tool. The tape head is also typically movable vertically and rotatably relative the layup tool. As a consequence, the tape head may be caused to move in a plurality of rectilinear and/or rotational axes under control of a computer program by which to apply several plies of composite tape material to the layup tool.

As the tape applicator head moves along the machine path in response to commands from the computer control, a path of composite tape is applied to the layup tool therealong. Ideally, the centerline of the tape path coincides precisely with the machine path. Unfortunately, the tape may shift such that the centerline of the tape path becomes laterally displaced from the machine path, especially where the machine path is not a natural path for the tape. If not corrected, such displacement error could lead to machine shut-down and/or damage to the tape.

To overcome such displacement errors, it is known to periodically provide commands to rotate the tape dispensing head about an axis through the head and intersecting the machine path, such rotation being in a direction to reduce the displacement of the tape from the machine path as the tape applicator head continues to apply tape along the machine path. While such a technique to correct for displacement errors is known to be advantageous, normal operation of the computer controls which implement that technique have introduced drawbacks which limit the effectiveness of such correction. In particular, such correction has been made on a temporal basis such that the tape dispensing head is rotated to correct for displacement error at predetermined or fixed intervals of time.

Making displacement error corrections at predetermined time intervals has been found to be disadvantageous. For example, when the tape applicator head is not moving (at standstill), but is bearing against the layup tool, generating an error correction command after an elapsed period of time may cause a rotational adjustment of the tape applicator head against the tape and layup tool, thereby resulting in damage to the tape. Further, because the speed at which the applicator head is moving along the machine path may vary widely and, thus, tape application speeds may vary widely, selection of the predetermined time interval for displacement correction, i.e., selection of the temporal clock period, does not allow for minimizing tape displacement error uniformly over a wide range of velocities. Thus, selection of the temporal clock period may necessarily require compromise in performance of the tape-laying machine and the product produced thereby.

SUMMARY OF THE INVENTION

The present invention provides a method and apparatus for rotationally adjusting the tape applicator head in a manner which is independent of the particular tape-laying speed(s) being encountered at the time. To this end, and in accordance with the principles of the present invention, corrections for displacement errors are made on a spatial, rather than temporal, basis. That is, irrespective of elapsed time between corrections, the tape head is rotationally adjusted based upon the amount of displacement error resulting after application of a predetermined or fixed length of tape. Corrections are thus based upon a spatial clock referenced to length of tape applied rather than a temporal clock referenced to the duration of tape application. Accordingly, at tape standstill, where no length of tape is being applied, no correction will be undertaken, thereby avoiding a possible disadvantage of prior temporally-clocked correction techniques. Similarly, because the tape head is spatially-clocked, corrections will be made no more often than is needed and before displacement errors become significant irrespective of the speed of tape application. Consequently, spatial clocking improves performance of the machine and minimizes the need to compromise machine performance as may occur when the tape head is temporally-clocked to make corrections.

Because computer controls are temporal in operation and, thus, monitor machine movement on a periodic basis it may occur that the length of tape applied may exceed the spatial clock period by the time the system checks for length of tape travel. For example, a computerized tape-laying machine may be adapted to monitor the position, and update the commanded moves, of the tape head once every 5 ms, at which time rotational adjustment of the tape head may also be made. By that time, however, the length of tape applied by the tape head may have exceeded the spatial clock period. As a consequence, the amount of displacement at the time of monitoring may not be the same as the displacement extant at the point in time that the spatial clock would have required correction, i.e., at the time when the spatial clock reference length of tape had been applied. To account for the effect of such temporal computer operation on the spatial clock of the present invention, there is further provided an interpolator by which displacement error correction will still be made based upon the displacement computed to have occurred at the point at which the predetermined length of tape had been applied. In this way, displacement error correction is made based upon a spatial clock even though the actual correction is made in a temporally-clocked system, thereby eliminating the need to redesign the computer operating system.

These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and together with a general description of the invention given above, and the detailed description of the embodiment given below, serve to explain the principles of the invention.

DESCRIPTION OF THE PREFERRED EMBODIMENT

To illustrate the present invention, a program controlled tape-laying machine and control incorporating spatially-clocked displacement error correction shall be described in detail. The machine 10 to be described herein is preferably a "CTL Multi-Axis CNC Fiber Placement Machine" and is available from Cincinnati Milacron Inc., the assignee of the present invention and described in a brochure of the same title, Publication No. SP-152-2, copyright 1986. Publication No. Sp-152-2 is incorporated herein by reference. Control 120 to be described herein is preferably an ACRAMATIC 975 CNC also available from Cincinnati Milacron, as described in "Feature Descriptions for the Cincinnati Milacron Acramatic 975C" (Publication No. CTL-452, revised Jan. 28, 1986), and as modified as described herein. Publication No. CTL-452 is incorporated herein by reference.

Figure 1:
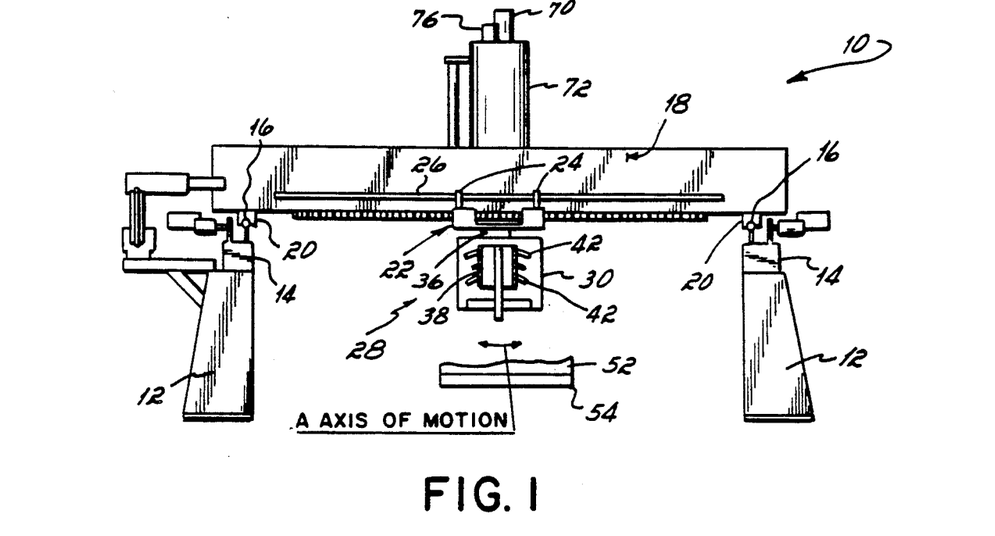
FIG. 1 is an end view of a tape-laying machine to which the present invention is applicable.
Figure 2:
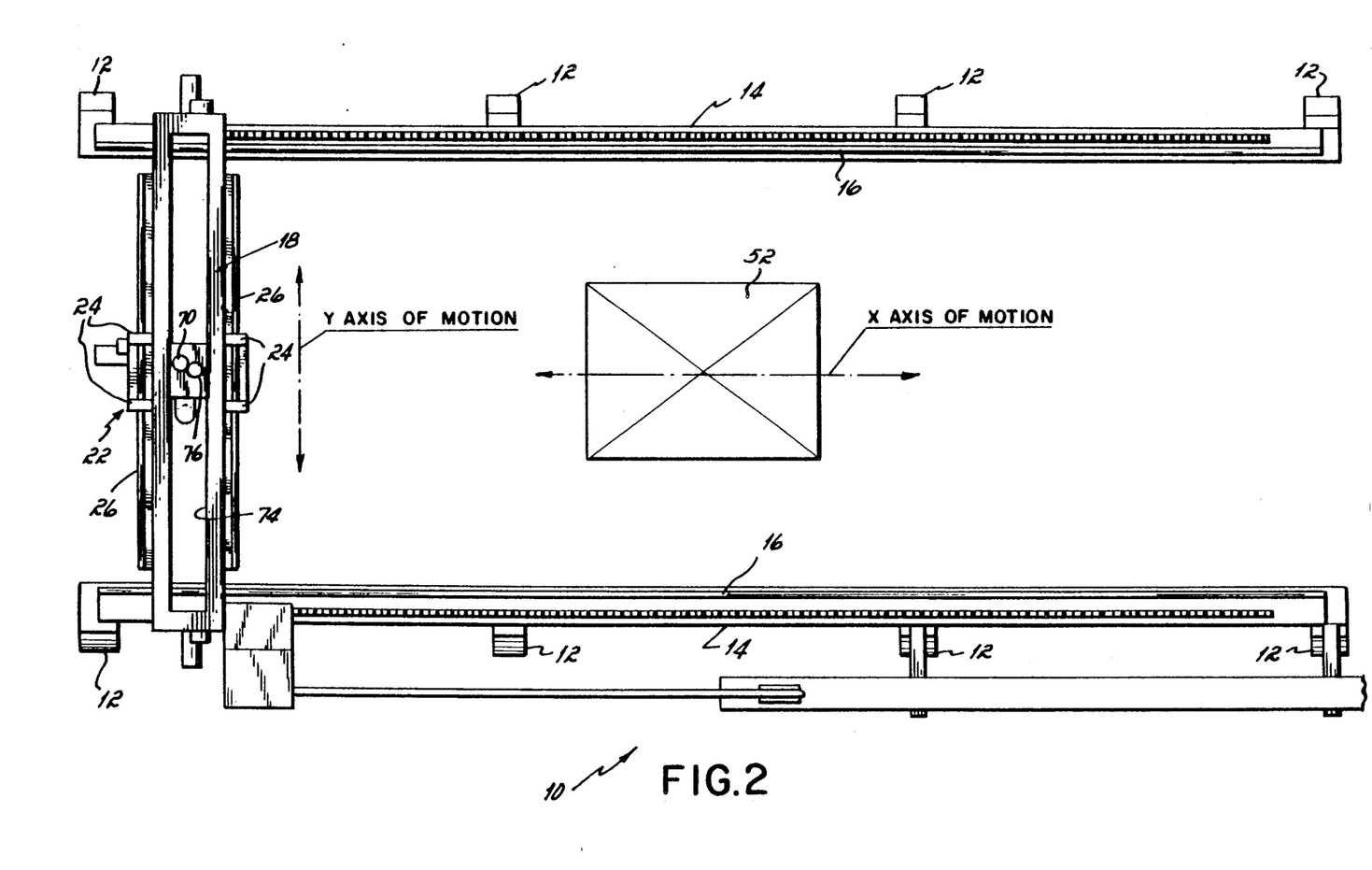
FIG. 2 is a top view of the machine of FIG. 1.

The machine shall be described with reference to FIGS. 1 and 2. Tape-laying machine 10 includes a plurality of vertical support stands or pylons 12 which fixedly support a pair of horizontal side members 14 to define a machine frame. Fixedly secured to each side member 14 is a cylindrical way 16. A slotted, horizontal gantry or member 18 is supported on side members 14 by slides 20 slidably supported on cylindrical ways 16. Gantry 18 comprises a large rectangular cross-section member to which slides 20 are rigidly affixed. Horizontal motion of gantry 18 relative to vertical support stands 12 defines the X-axis of motion of machine 10.

A carriage 22 is movably supported upon gantry 18. To this end, carriage 22 includes slides 24 which are slidably supported upon cylindrical ways 26. Ways 26 are fixedly attached to gantry 18. Horizontal motion of carriage 22 relative to gantry frame 18 along ways 26 is defined as the Y-axis of motion.

Figure 3:
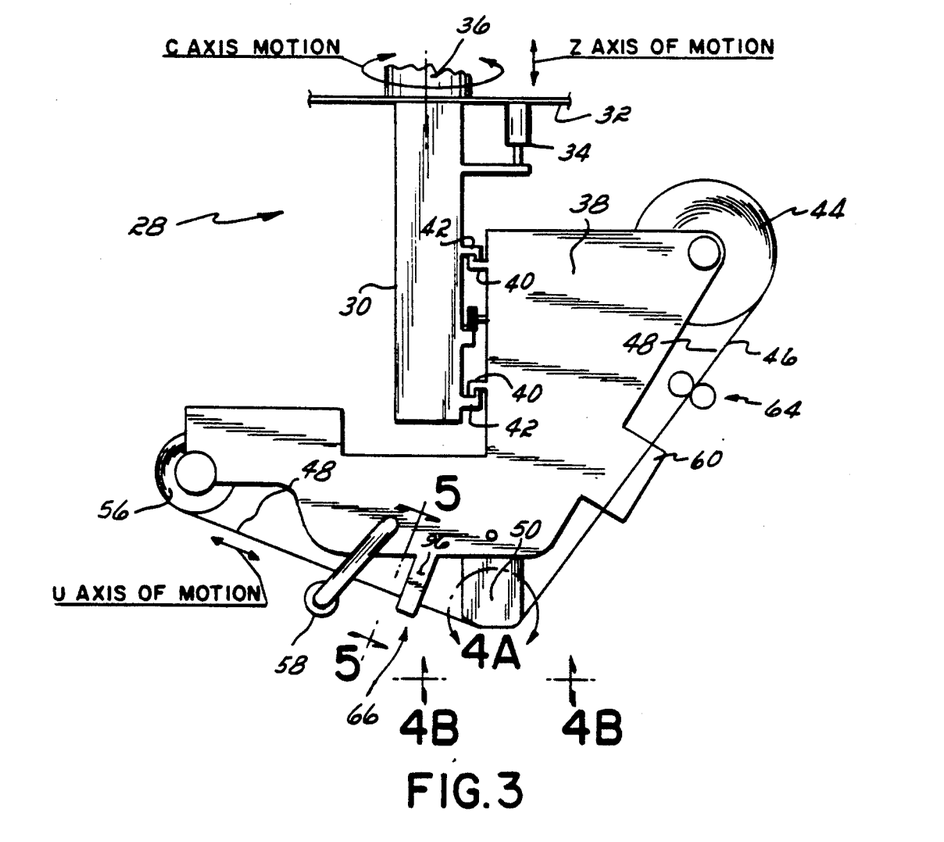
FIG. 3 is a schematic side view of the tape applicator head of the machine of FIG. 1.

As seen in FIG. 3, carriage 22 provides support for a tape applicator head 28 or the like. Head 28 includes a rigid vertical guide or backing plate 30 which is movably supported to carriage 22 for movement of tape head 28 in a plurality of axes. Plate 30 may be pneumatically suspended from upper, horizontal plate 32 by left and right fluid actuators (schematically represented at 34). Upper plate 32 of head 28 is in turn rotatably coupled to column 36 which is carried by carriage 22. Vertical movement of head 28 is accomplished by movement of column 36 upwardly or downwardly and is defined as the Z-axis of motion of machine 10; rotational movement of head 28 is accomplished by rotation of upper plate 32 relative column 36 and is defined as the C-axis of motion. Head 28 further includes a moveable frame 38 to which are mounted slides 40 coupled for arcuate movement of frame 38 along way 42 mounted to plate 30. Arcuate or angular movement of head 28 is accomplished by moving frame 38 along arcuate ways 42 and is defined as the A-axis of motion. Further details of the various axes of motion and control are provided in U.S. Pat. Nos. 4,719,397; 4,799,981; and 4,808,899 and will not be set out in substantial detail herein. The disclosures of U.S. Pat. Nos. 4,719,397; 4,799,981; and 4,808,899 are incorporated herein by reference.

Figure 4A:
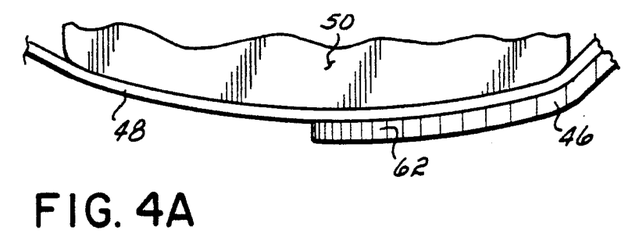
FIG. 4A is an enlarged view of the area encircled within arrow 4A of FIG. 3.

Rotatably supported on frame 38 is a feed reel or spool 44 on which is wound generally inelastic composite tape material 46 secured to a carrier or backing web 48 (FIG. 4). Web 48 passes along the U-axis of motion between feed reel 44, over a presser member or tape dispensing shoe 50 (shown diagrammatically in FIG. 3) whereat tape 46 is to be applied to a layup tool 52 on mold 54 situated within the confines of machine 10 (FIGS. 1 and 2), and thence onto takeup reel or spool 56, also rotatably supported on frame 38. To this end, as tape material 46 is applied to layup tool 52 by shoe 50, it peels away from backing web 48 whereafter web 48 is taken up by takeup reel 56 Shoe 50 may be pivotably connected to frame 38 to permit a compaction roller 58 to swing into place between web 48 and tape 46 to complete placement of a tail, for example. Tape head 28 may be like that shown in U.S. Pat. No. 4,557,783, the disclosure of which is also incorporated herein by reference.

Midstream of shoe 50 and feed spool 44 is tape cutter 60 to shape the tape tails and ends (as exemplified by tape edge 62 in FIGS. 4A and 4B), as is well understood. Further positioned midstream of shoe 50 and spool 44 is resolver 64 such as a pinch roll position sensor through which web 48 with tape 46 passes for measuring length of tape travel in the U-axis and corresponding to length of tape applied to layup tool 52. Rigidly attached to frame 38 between shoe 50 and takeup spool 56, and spaced closely adjacent shoe 50, is tape displacement sensor 66, the purpose of which will be explained hereinafter.

Focusing specifically on the C-axis of motion, tape displacement error correction is accomplished by adjusting angular rotation of tape head 28 in the C-axis. As is well understood, rotation of head 28 in the C-axis direction is effected by rotation of plate 32 by drive motor 70 mounted to housing 72 coupled to carriage 22 and through lengthwise slot 74 in gantry 18 for movement therewith. Drive motor 70 imparts rotation to plate 32 through transmission 76 and related gearing (not shown). To provide positional information of head 28 in the C-axis, motor 70 incorporates a position transducer or resolver 78 (FIG. 7) whereby rotation of head 28 is translated to a feedback signal for utilization in control of motor 70. To this end, change in position commands generated within computer control 120 and the resolver feedback signals provide a closed loop servo control to generate velocity command signals to drive motor 70 whereby to place tape head 28 in the C-axis angular position commanded by the computer.

Figure 7:
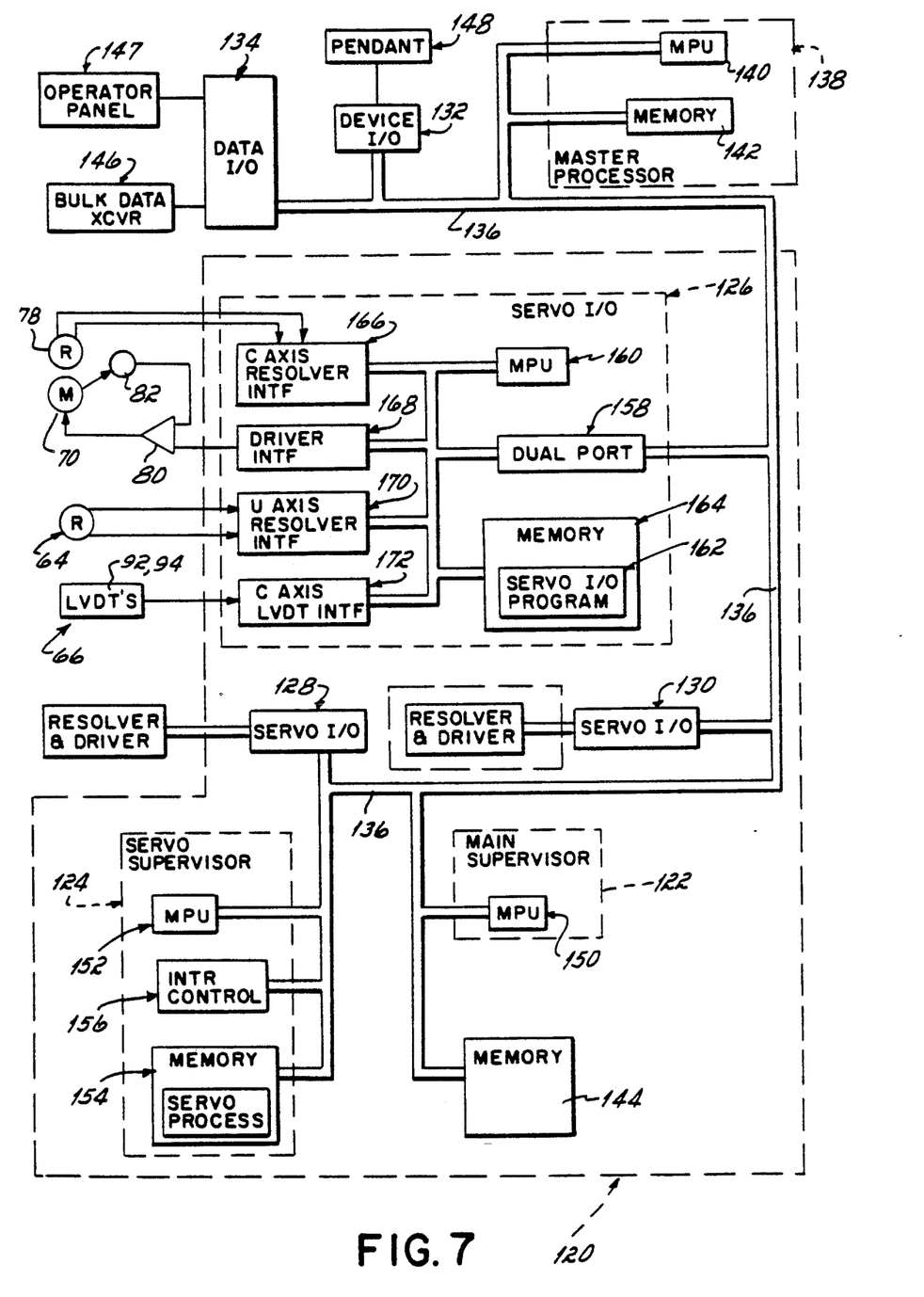
FIG. 7 is a block diagram of the control for the machine shown in FIGS. 1 and 2.

Preferably, drive motor 70 also includes a conventional velocity feedback loop comprising a drive amplifier 80 and tachometer 82 (FIG. 7). As is conventional, the output of tachometer 82 is fed back to related drive amplifier 80 for a velocity feedback loop. The drive amplifier further preferably includes a gain adjustment (not shown) to manually set the gain thereof so that a predetermined voltage signal from the related servo control will cause rotational movement of head 28 in the C-axis at a predetermined velocity as is also well understood. The drive amplifier further preferably includes a balance adjust (not shown) by which to manually set the bias therein so that a signal of zero volts from the servo control will result in a velocity of zero of the head 28 in the C-axis.

Figure 4B:
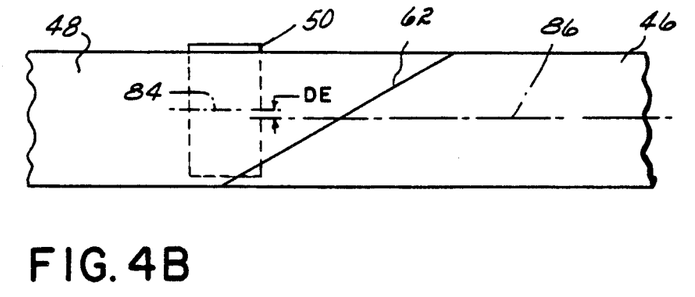
FIG. 4B is a bottom view taken along line 4B—4B of FIG. 3 and showing the tape being displaced relative the shoe.
Figure 5:
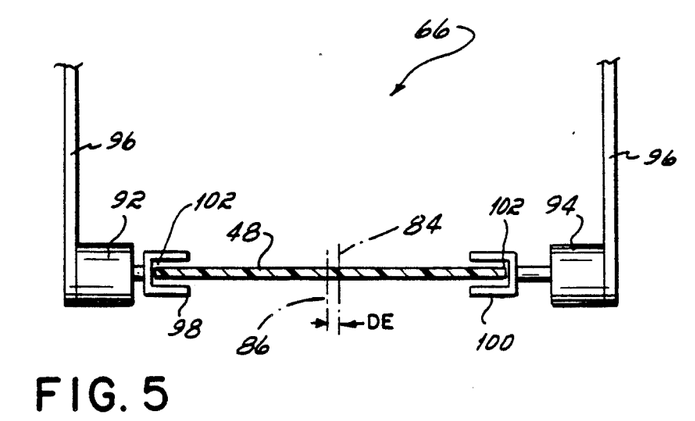
FIG. 5 is a view taken along line 5—5 of FIG. 3 showing a tape displacement sensor with the tape displaced as in FIG. 4B.
Figure 6:
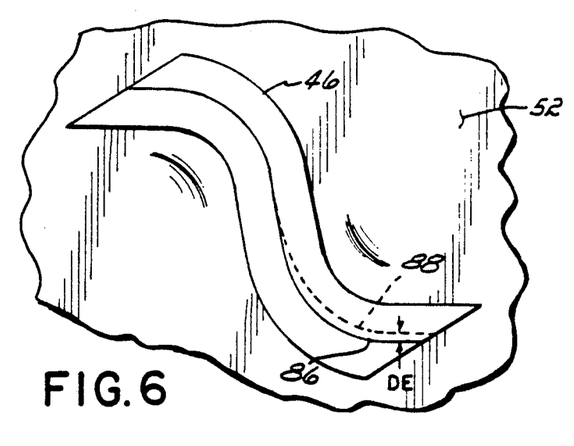
FIG. 6 is a simplified illustration of a course of tape applied to a layup tool to show the effect of tape displacement.

It will be appreciated that tape 46 and shoe 50 have a finite width. To define the machine path along which tape is to be applied to the layup tool, it is typical to refer to the path of travel of centerline 84 of the shoe 50 (FIGS. 4B and 5). Desirably, centerline 86 of tape 46 should be colinear with shoe centerline 84 such that application of tape 46 to layup tool 52 will define a tape path having a centerline coincident the machine path. However, as shown diagrammatically in FIG. 4B, tape 46 has a tendency to slide laterally relative shoe 50, especially where shoe 50 moves along a machine path which does not define a "natural path" of the tape such that the tape path centerline is offset from the machine path. The amount of lateral shifting, the distance between centerlines 84 and 86, is referred to as displacement error (DE). Application of a course of tape with displacement error may be exemplified in FIG. 6. As seen in FIG. 6, the machine path is exemplified by dotted line 88 corresponding to the path followed by shoe centerline 84. Similarly, as shoe 50 moves along the machine path, tape may be applied such that the centerline 86 of the tape path defines the solid line in FIG. 6 being laterally displaced from machine path 88 by an amount DE.

To measure the amount of displacement error, tape displacement sensor 66 coupled to frame 38 measures the lateral slippage of tape web 48 relative shoe centerline 84. One such sensor 66 is shown in FIG. 5 to include confronting left and right linear voltage transducers (LVDT) 92, 94 supported by brackets 96 attached to frame 38. LVDT yokes 98, 100 are biased to extend outwardly from their respective LVDT and towards one another to confine web 48 therebetween. Web 48 passes through yokes 98, 100, such that web edges 102 are confined within yokes 98, 100. Consequently, any change in web edge position resulting from lateral shifting of web 48 will push one of the yokes into its associated LVDT while allowing the other to extend further from its associated LVDT, both corresponding to the direction and amount of shift of tape path centerline 86 from the shoe centerline 84 (and, hence, from machine path 88). The readings (LDT and RDT) obtained from LVDT's 92, 94 may be utilized to provide a value corresponding to the displacement error equal to the offset between centerlines 84, 86 which in turn corresponds to the lateral displacement of the tape from the machine path. Although shown with LVDT's, optical or other non-contact sensors could be utilized for sensor 66 as will be understood by those skilled in the art.

With respect to determining when to correct for displacement error on a spatial clock basis, it will be appreciated that the length of tape passing through pinch roll resolver 64 as tape is being applied to layup tool 52 corresponds to the length of tape being applied. Thus, the readings from resolver 64 may be utilized to determine whether the spatial clock period has elapsed. In a preferred embodiment, the spatial clock period is 0.15 in which event computer control 120 is to provide displacement error correction for every 0.15 inch of tape payout as will now be illustrated with reference to the block diagram of FIG. 7.

Control 120 directs motion of the members of machine 10. Control 120 is a digital micro-processor-based computer system. Hence, in the preferred embodiment, the various signals utilized within control 120 are implemented as digital words. Control 120 includes a plurality of independent modules including main supervisor (or block processor) 122, servo supervisor 124, servo modules 126, 128, and 130 (servo I/O's) each of which may be coupled to one or more drivers and resolvers, device input/output module 132, and data input/output module 134 all connected by a common bus 136. Each of these modules typically includes a microprocessor and associated peripheral devices and memory as required for the function of the module. Applicant has chosen to implement these modules using the 80186 microprocessor and peripheral devices available from Intel Corporation. Added to control 120 is a master processor 138 which communicates over common bus 136 for purposes of C-axis displacement error correction in accordance with the principles of the present invention. To this end, master processor 138 includes its own local microprocessor unit 140 (such as an 8086 microprocessor, 8087 floating point coprocessor, and related peripherals available from Intel Corporation), and memory 142 as required for interpolation and related computations to determine the displacement error correction factor (C-STR-CMD). Alternatively, servo I/0 126, for example, could include the functionality of master processor 138 by using a faster and more capable microprocessor. Control 120 also includes a main memory 144 in which is stored the application program(s) defining desire movement of the members to construct a component such as an aircraft wing, for example, on layup tool 52 positioned between pylons 12.

The overall cycle of operation of machine 10 is defined by an application program stored in memory 144 and executed by main supervisor 122. The application program stored within memory 144 may be produced on independent equipment and loaded through the data input/output module 134 from a bulk data transceiver 146 and monitored or modified through operator panel 147. A pendant 148 is coupled to bus 136 by device I/0 132 by which to manually control movement of the members of machine 10.

During execution of the application program, microprocessor unit 150 of main supervisor 122 executes the selected programs stored in memory 144 until the end of the program has been reached, i.e., all the moves of tape head 28 have been completed. As described in greater detail in conjunction with FIGS. 6A and 6B of aforesaid U.S. Pat. No. 4,799,981, which description has been incorporated herein by reference, movement of the machine members for each move of tape head 28 along the machine path is effected by span and control signals generated by main supervisor 122 and utilized by servo supervisor 124 to repetitively generate change in position command signals by which to control operation of the servo control modules 126, 128, and 130 on a temporal basis. Servo supervisor 124 includes a local microprocessor 152 executing servo processing programs stored within local memory 154 and an interrupt control 156 responsive to interrupts from a master servo I/O (one of the servo I/O's, e.g., servo I/O 130 may be selected as the master servo I/O). In response to an interrupt from servo I/O 130, preferably every 5 milliseconds (ms), change in position command signals are determined by servo supervisor 124 and distributed to the appropriate servo mechanism input/output interface. Each of the servo mechanism input/output interface modules provides the necessary interface circuitry for connection to at least one drive motor and its associated resolver by which to control the various axes of movement of head 28.

In conjunction with added master processor 138, servo I/O module 126 controls the C-axis. To this end, module 126 may be coupled to drive motor 70, resolver 78, tachometer 82, drive amplifier 80, pinch roll resolver 64 and position sensor 66 so as to collect data from tape 46 and control rotation of tape head 28. Connection between module 126 and common bus 136 is achieved through dual port memory device 158. Data to be exchanged between module 126 and other modules within the system is transferred asynchronously through dual port memory device 158. Local processor 160 executes servo input/output programs 162 stored within local memory 164. Local processor 160 receives C-axis resolver signals through C-axis resolver interface 166 by which the angular position in the C-axis of head 28 may be known. In turn, local processor 160 generates signals to driver interface 168 based upon commands from servo supervisor 124 (and as altered by a displacement error correction factor from master processor 138 as will be described) to cause rotation of motor 70 thereby positioning head 28 as desired in the C-axis. Module 126 may further include U-axis resolver interface 170 for obtaining data from pinch roll resolver 64 indicative of length of tape travel in the U-axis and C-axis LVDT interface 17 for obtaining the position of the yokes of LVDT's 92, 94 of position sensor 66 and from which the tape centerline 86 relative shoe centerline 84 may be determined. The information from interfaces 170 and 172 is subsequently made available to master processor 138 which, in turn, determines a displacement error correction factor to be used by module 126 to alter its velocity commands to driver interface 168 accordingly. Although shown coupled to the same servo I/O module, resolver 78, resolver 64 and sensor 66 could be monitored by one or more of the other servo I/O's instead, in which event the several servo I/O's would collectively provide the appropriate data from the tape to master processor 138 through their respective dual port memories 158.

The control procedure for effecting C-axis motion shall be described with reference to the flow charts. Referring to the sequence of FIG. 8, the procedure implemented in servo I/O 126 for C-axis control is initiated every 5 ms (step 200) and begins with an interrupt (step 202) of the servo supervisor 124 which provides the value for the next amount of commanded move of head 28 in the C-axis referred to herein as CMD INCR (and referred to as #CMD in aforesaid U.S. Pat. No. 4,808,899). The value of CMD INCR is loaded from servo supervisor 124 into dual port memory 158 of servo I/O 126 and is thereafter available to local processor 160 of servo I/O 126 as needed. At process step 204, data regarding resolvers 64 and 78 and sensor 66 is read from respective interfaces 170, 166 and 172. The data regarding resolver 64 ("UINC") and sensor 66 ("LDT" from LVDT 92 and "RDT" from LVDT 94) are provided to dual port memory 158 for use by master processor 138 to define the displacement error correction factor as will be described. The value from drive motor resolver 78 is further utilized by microprocessor unit 160 within servo I/O 126 at step 206 to calculate the actual position ("ACT POS") of head 28 in the C-axis. At step 208, the value of CMD INCR and a displacement error correction factor C-STR-CMD previously loaded into dual port memory 158 from master processor 138 are read by microprocessor unit 160 and utilized at process step 210 to calculate a new commanded position ("CMD POS") of head 28 in the C-axis by summing CMD INCR with the current value of CMD POS. Also, at step 210, a following error signal (FE) is calculated as the difference between the newly calculated command position (CMD POS) and the actual position (ACT POS) plus the correction factor (C-STR-CMD) for displacement error, if any. Thereafter, the sequence continues (step 212) to a typical servo control sequence such as the sequence described starting at step 312 of FIG. 6 of aforesaid U.S. Pat. No. 4,808,899 (which description has been incorporated herein by reference) to thereby generate velocity commands which propel head 28 in the C-axis based upon the data (CMD POS and FE) generated as above, but including the correction factor for tape displacement errors whereby to rotate tape head 28 in the C-axis as commanded by servo supervisor 124 and as modified to reduce displacement of the tape relative to the machine path as more tape is applied along the machine path.

Figure 8:
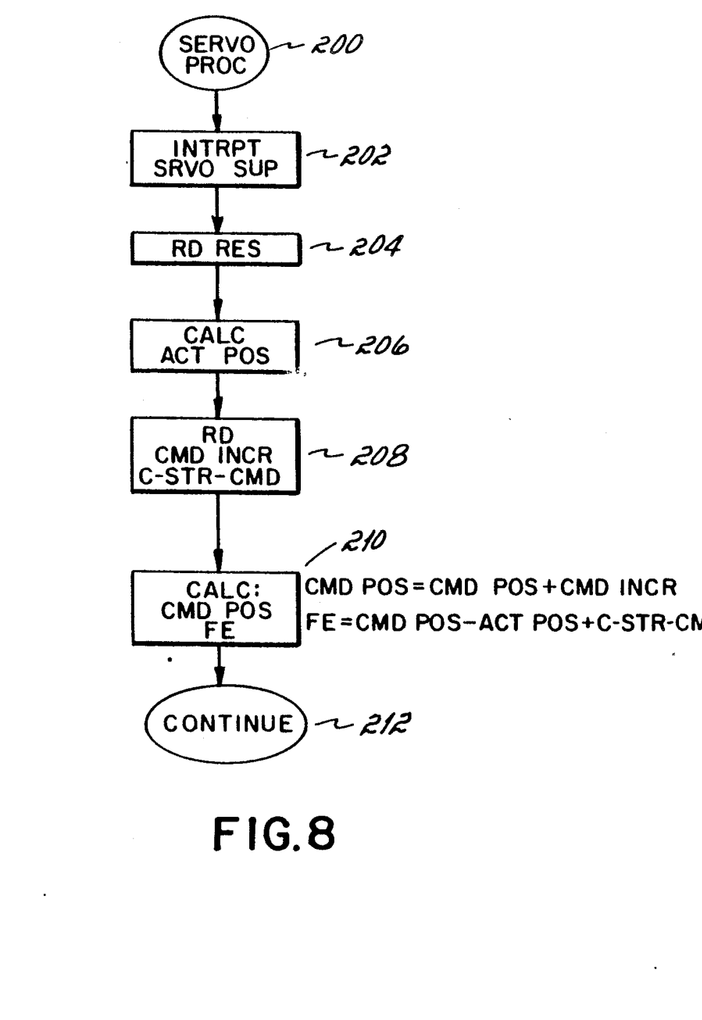
FIG. 8 is a flow chart of operation of the servo I/O of FIG. 7 for controlling the C-axis in accordance with the principles of the present invention.

Desirably, the C-STR-CMD factor could be computed after each predetermined length of tape 48 has been applied, that predetermined length being defined as the spatial clock period SPAT CLK, and the C-axis position corrected accordingly. To this end, moves of tape head 28 could be commanded once for each interval of SPAT CLK rather than temporally. Similarly, servo I/O 126 could continuously monitor tape travel in the U-axis via pinch roll resolver 64 and interface 170 and calculate the correction factor C-STR-CMD upon the coincidence of the length of tape being applied equalling SPAT CLK, i.e., the spatial clock period has elapsed. At that point, position sensor 66 could be read to indicate the amount of displacement error and C-STR-CMD updated in accordance with the value obtained therefrom and C-axis correction undertaken accordingly. In such an approach, C-STR-CMD could be related to the difference in LVDT readings (LDT and RDT) at each occurrence of SPAT CLK (corrected for any offset null in the zero position of the LVDT's) and the spatial clock period (SPAT CLK) in an effort to steer the tape back to the machine path as the tape is applied over succeeding spatial clock periods.

Control 120 is temporally, not spatially, based, however. In such a temporal system, movements of the tape head are commanded at selected intervals such as every 5 ms defined as an interrupt interval. Consequently, servo I/O 126 may not continuously monitor tape travel or update the C-axis position, but may do so instead at the selected time intervals. The length of tape applied will accumulate as each interrupt interval occurs such that up to some number of intervals varying as the rate of tape application varies, the length of tape applied may be less than SPAT CLK, whereas in the next subsequent interval the length of tape applied may have exceeded SPAT CLK. Thus, tape displacement error may not be known for as much as 5 ms after the spatial clock period elapses and would then be based upon a reading from sensor 66 that corresponds to such error at a distance of tape travel other than SPAT CLK. Further, the finite time required to compute the correction factor based on that displacement error may further delay initiation of the correction for the displacement.

In accordance with the present invention, correction is to occur based upon displacement error when SPAT CLK elapses. To this end, master processor 138 is provided which determines the displacement error at SPAT CLK by interpolating from the displacement errors determined at selected time intervals before and after the length of tape applied equals SPAT CLK. The procedure for spatially-clocking the C-axis to correct for displacement with interpolation for the temporally-clocked nature of control 120 is stored, for example, in memory 142 and performed by local processor 140 of master processor 138 as will now be described with reference to FIGS. 9–15.

Figure 9:
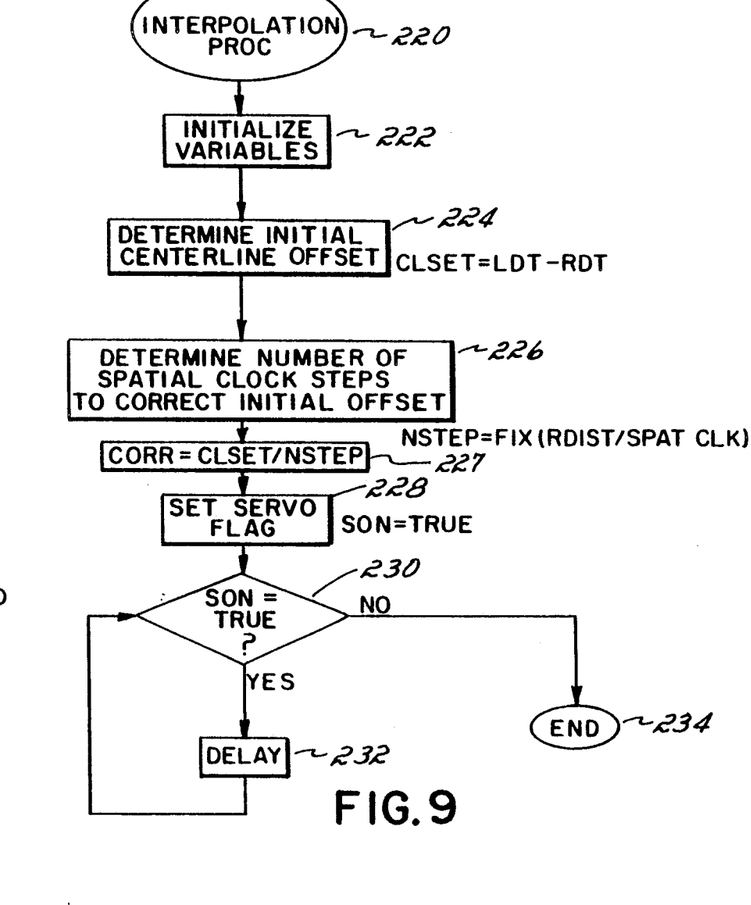
FIGS. 9-15 are flow charts of the operation of interpolation processor of FIG. 7 for generating the appropriate displacement error correction factor in accordance with the principles of the present invention.

Before each new course or strip of tape 46 is applied, i.e., each time the tape head is caused to position shoe 48 against layup tool 52 to apply tape thereto, the interpolation procedure is reinitialized in accordance with the procedure of FIG. 9 to locate the actual position of tape centerline 86 relative shoe centerline 84, i.e., the initial amount of displacement error, if any. To this end, the interpolation procedure begins at step 220 upon receipt of a signal from main supervisor 122 that a new course of tape is to be applied. At step 222, the numerical variables to be utilized in the interpolation procedure are set equal to zero, RDIST is set equal to 5.0 and SPAT CLK is set equal to 0.15. At step 224, the values from sensor 66 previously input into dual port memory 158 as a result of the most recent occurrence of the sequence of FIG. 8 are read therefrom and the initial offset of tape centerline relative the shoe centerline (CLSET) is determined by subtracting the difference in values between the left and right LVDT readings (CLSET=LDT−RDT).

At step 226, it is determined how many spatial clock iterations or periods (NSTEP) are to be utilized to correct for that initial offset (CLSET) by taking the integer value of the allowed ramp distance (RDIST) for correction divided by the spatial clock period (SPAT CLK). As will be appreciated, it is desirable to correct for initial displacement error over several lengths of SPAT CLK rather than all at once. For example, if initial displacement error is as much as 0.030 inch, any attempt to rotate tape head 28 in the C-axis to correct for that error all at once may tear backing web 48 or otherwise cause damage. Accordingly, such initial error is preferably to be reduced over a small fractional length at the beginning of the course of tape to be applied. By way of example, for tape course lengths between 2 and 50 feet, such as are typical for manufacture of aircraft parts such as a wing, RDIST is set equal to 5.0 inches so that any initial offset is corrected over the first five inches of tape applied. Further preferably, a spatial clock rate of 0.15 inch is selected in which event NSTEP=FIX(RDIST/SPAT CLK)=33, where FIX(X) is the function to take the integer value of (X). NSTEP could also be preprogrammed or input as a constant.

Once the number of correction steps is known, a correction factor (CORR) is calculated at step 227. Thereafter, the servo enable flag is set (SON=TRUE) at step 228 and master processor 138 enters an endless-loop routine defined by step 230 at which the status of SON is tested and if TRUE, the sequence loops back to decision step 230 after a delay 232, and if no longer TRUE, the interpolation procedure terminates at step 234 to await the next course of tape. As with FIG. 8, master processor 138 is also interrupted every 5 ms and breaks out of the above-described endless-loop routine to perform the sequence of FIGS. 10–15 by which the correction factor for tape displacement, C-STR-CMD, is generated. Thereafter, the process returns to the endless-loop routine of FIG. 9 until again interrupted or terminated if, upon return, SON is no longer TRUE. When the course of tape is completed (shoe 45 is off-plane), SON will be set equal to FALSE to end the sequence until the next course of tape is to be applied.

Figure 10:
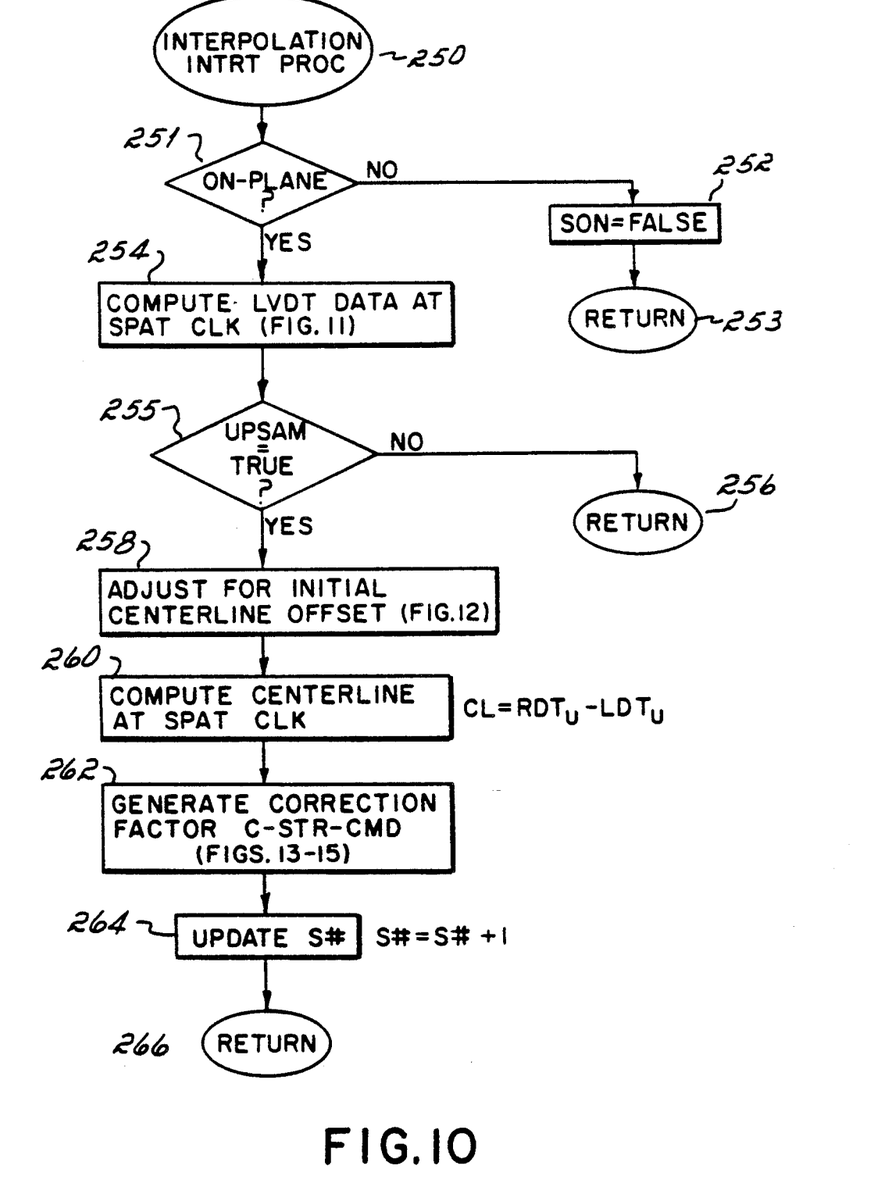

Referring now to FIG. 10, an overview of the procedure followed during the interpolation interrupt process will now be described. That procedure begins upon interrupt as indicated at step 250 and proceeds at step 251 to determine if shoe 45 is on-plane (tape being applied). If not, SON is set equal to FALSE at step 252 and the procedure returns at step 253 to the endless-loop routine of FIG. 9 whereupon the sequence will end because SON=FALSE. If, however, the shoe is on-plane, the procedure continues to step 254 to compute the LVDT data (LDT$_U$ and RDT$_U$) at SPAT CLK based upon the procedure shown in FIG. 11 as will be described hereinafter. After the procedure of step 254, the sequence continues to step 255 whereat the value of UPSAM is tested to see if it is TRUE. If not, the interpolation interrupt procedure ends and the process returns (step 256) to the endless-loop routine of FIG. 9. If, however, UPSAM=TRUE, the sequence continues to step 258 whereat the adjustment for the initial centerline offset is taken into account as described in FIG. 12. The sequence then continues to step 260 whereat the tape centerline at SPAT CLK is determined by taking the difference between the LVDT data at SPAT CLK determined at step 254. From there, the sequence continues to step 262 whereat the correction factor C-STR-CMD is determined (FIGS. 13–15) and loaded from master processor 138 into dual port memory 158 of servo I/O 126 for use in the servo procedure of FIG. 8 as previously described. Upon conclusion of step 262, the sample update iteration number (S#) is incremented by one at step 264 and the process returns at step 266 to the endless-loop routine of FIG. 9.

Figure 11:
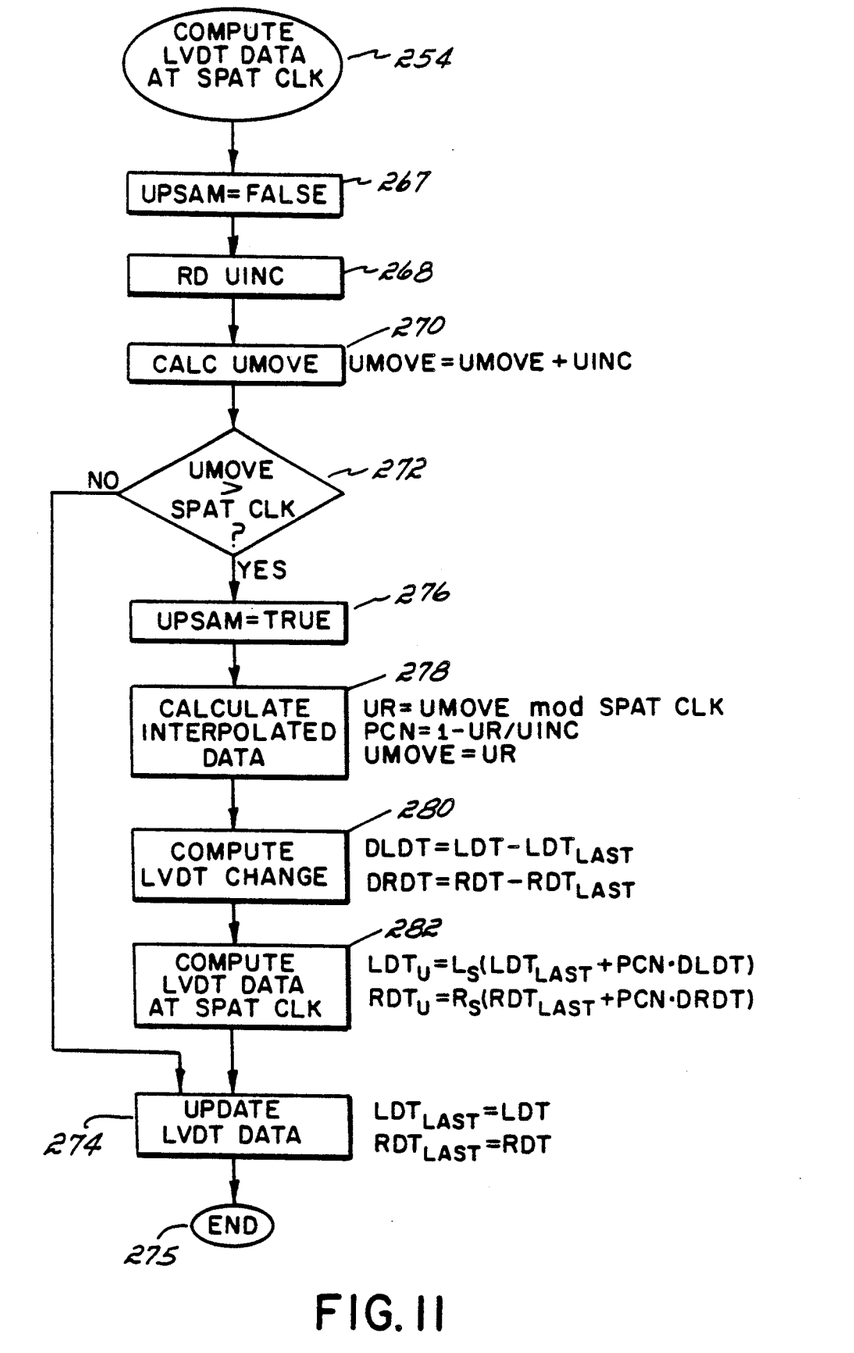

The procedure to compute the LVDT data (LDT$_U$ and RDT$_U$) at SPAT CLK will now be described with respect to FIG. 11. That procedure (step 254) begins by setting UPSAM equal to FALSE at step 267. Thereafter, at step 268, the value of UINC is read from dual port memory 158 and is equal to the length of tape applied as read by resolver 64 (and stored in dual port memory 158) since the last interrupt interval. At step 270, the accumulated length of tape applied (UMOVE) is calculated equal to the amount of UMOVE calculated at the previous interrupt interval plus the amount of UINC read at step 268. The procedure continues to step 272 whereat UMOVE is compared against SPAT CLK. If UMOVE does not exceed SPAT CLK, the length of tape applied has not yet reached the predetermined length, in which event the displacement error correction factor is not to be updated. Accordingly, the procedure will branch to step 274 whereat the current LVDT data from dual port memory 158 (LDT and RDT) will be updated for use during the next interrupt interval (LDT$_{LAST}$=LDT and RDT$_{LAST}$=RDT) and the procedure ends (step 275) by returning to step 255 of FIG. 10 wherein UPSAM will not be TRUE due to the setting of UPSAM=FALSE in step 267 of FIG. 11, which will result in a return at step 256 to the endless-loop routine of FIG. 9.

On the other hand, if UMOVE is greater than SPAT CLK at step 272, then it may be necessary to adjust the value of C-STR-CMD because the spatial clock reference length of tape will have been applied. To this end, the procedure of FIG. 11 continues to step 276 whereat UPSAM is set TRUE for purposes of FIG. 10 and then to step 278 whereat a series of interpolated data is calculated. Specifically, UMOVE is set equal to the non-integer remainder (UR) of tape advance after the spatial clock period elapsed, and a percent factor (PCN) is computed for use in determining where between interrupt intervals the spatial clock period elapsed:

$$UR = UMOVE \bmod SPAT\ CLK$$

$$PCN = 1 - UR/UINC$$

$$UMOVE = UR$$

wherein UMOVE mod SPAT CLK is the non-integer remainder of UMOVE divided by SPAT CLK.

At step 280, the amount of change in the LVDT readings since the previous interrupt interval is calculated according to the formulae:

$$DLDT = LDT - LDT_{LAST}$$

$$DRDT = RDT - RDT_{LAST}$$

Subsequently, at step 282, the LVDT data at SPAT CLK is determined in accordance with the formulae:

$$LDT_U = L_S(LDT_{LAST} + PCN\ DLDT)$$

$$RDT_U = R_S(RDT_{LAST} + PCN\ DRDT)$$

wherein $L_S$ and $R_S$ are scaling constants to produce $LDT_U$ and $RDT_U$ in inches taking into account the characteristics of the LVDT's and the electronics associated therewith.

Once the LVDT data at SPAT CLK is determined, the actual LVDT data is updated at step 274 as previously described whereupon the procedure returns to step 255 of FIG. 10 with UPSAM=TRUE so that the sequence will further proceed to step 258 to take into account the initial centerline offset as will now be described in connection with FIG. 12.

Figure 12:
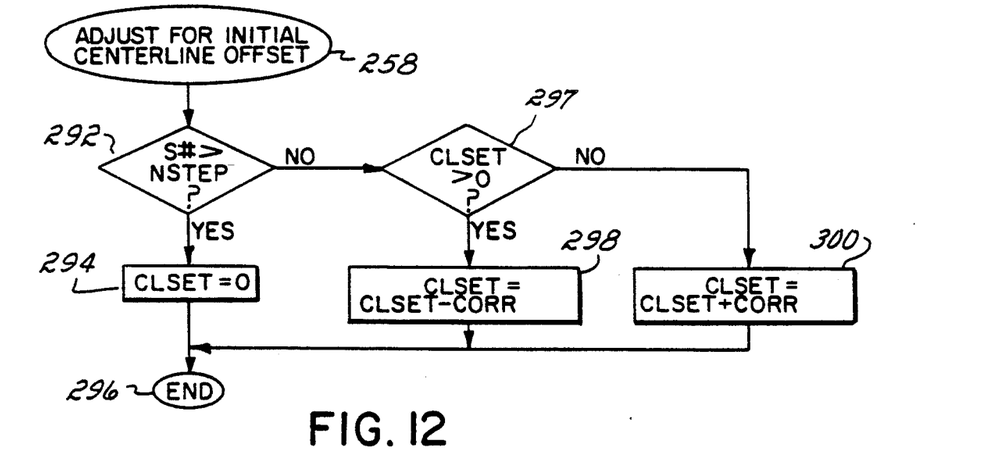

The procedure of FIG. 12 compares the value of S# with NSTEP at step 292. If S# exceeds the number of steps required for the initial centerline offset (NSTEP), the amount of initial offset (CLSET) is set to zero at step 294 and the procedure returns at step 296 for performance of step 260 of FIG. 10. If, on the other hand, the initial centerline offset has not yet been fully accounted for as indicated by a NO at step 292 of FIG. 12, the initial offset is to be adjusted in accordance with the value of correction (CORR) calculated at step 227 of FIG. 9. To this end, if CLSET is positive at step 297, the amount of initial offset is decremented at step 298 by the amount of CORR, whereas if CLSET is not positive at step 297, the amount of initial offset is incremented at step 300 by the amount of CORR. The procedure of FIG. 12 then ends at step 296 as previously described, whereupon the sequence continues to step 260 of FIG. 10 to compute the tape centerline at SPAT CLK as previously described, and then to step 262 for generating the correction factor (C-STR-CMD) to servo I/O 126 as will now be described in connection with FIGS. 13-15.

Figure 13:
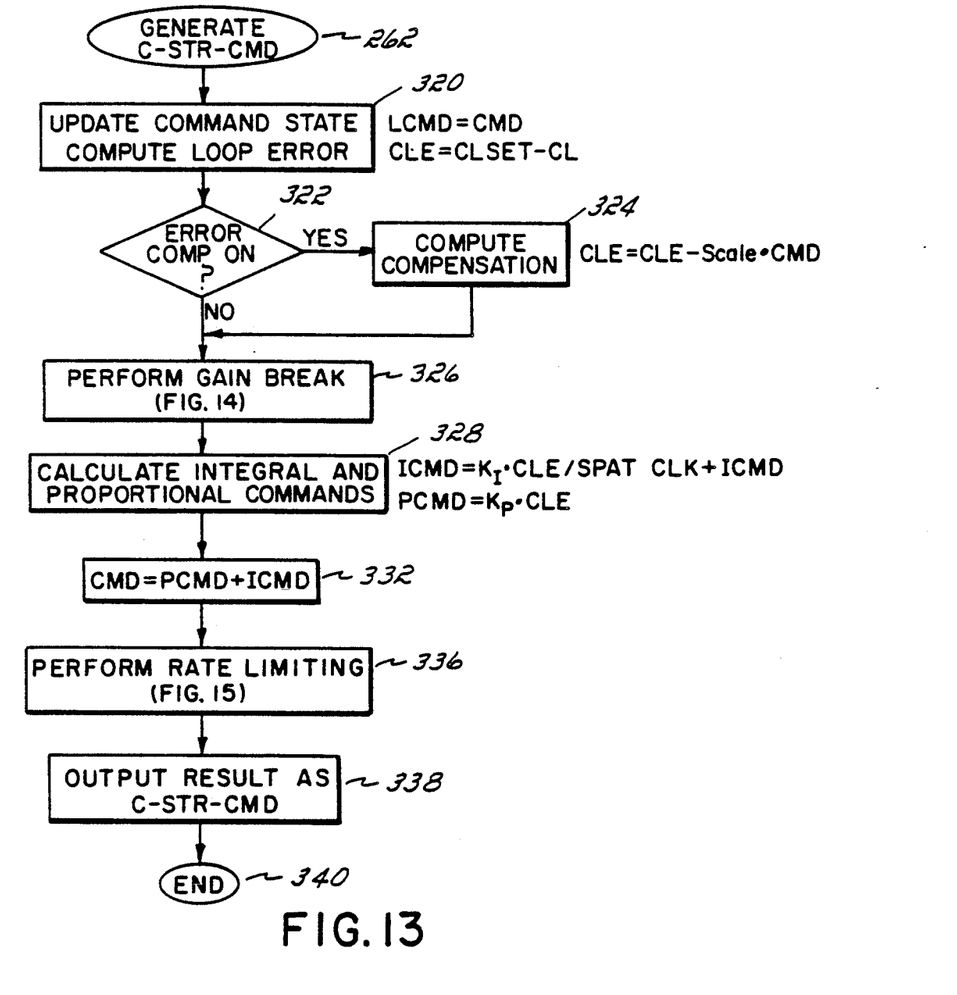

The procedure for generating C-STR-CMD begins at step 262 of FIG. 13 and proceeds to step 320 whereat the command state (LCMD) is updated (LCMD=CMD) and a loop error (CLE) is computed (CLE= CLSET−CL). At step 322, the procedure continues to step 324 if error compensation is enabled, whereat the loop error (CLE) is compensated by subtracting from the computed loop error of step 320 a scaled version of CMD. In the described embodiment, sensor 66 is about one inch from the tape laydown point under shoe 50. As will be appreciated, rotation of tape head 28 to rotate shoe 50 in the C-axis will also result in rotation of sensor 66, but because web 48 is attached to tape 46 so close to sensor 66, web 48 will displace somewhat and produce an erroneous centerline reading. Loop error (CLE) may be compensated to account for this error. In one embodiment, the value of scale is equal to −0.017453293 to convert from degrees to radians of error at a spacing of one inch between sensor 66 and the tape laydown point.

The procedure of FIG. 13 continues to step 326, or proceeds directly to step 326 from step 322 if error compensation was not enabled, to perform the gain break procedure of FIG. 14 by which to modify the gain of the system depending upon the magnitude of the displacement error as will be subsequently described. After the gain break procedure is performed, step 328 is undertaken in which integral and proportional commands (ICMD and PCMD) are computed as follows:

$$ICMD = K_I \cdot CLE/SPAT\ CLK + ICMD$$

$$PCMD = K_P CLE$$

The values of constants $K_I$ and $K_P$ selected to improve the ability of the system to null out biases or offsets in machine 10 and control 120, and improve overall transient performance of the tracking loop, respectively. In one embodiment, KI=10° and KP=100°/inch of error. To disable the integrator function, KI could be set to zero.

Figure 15:
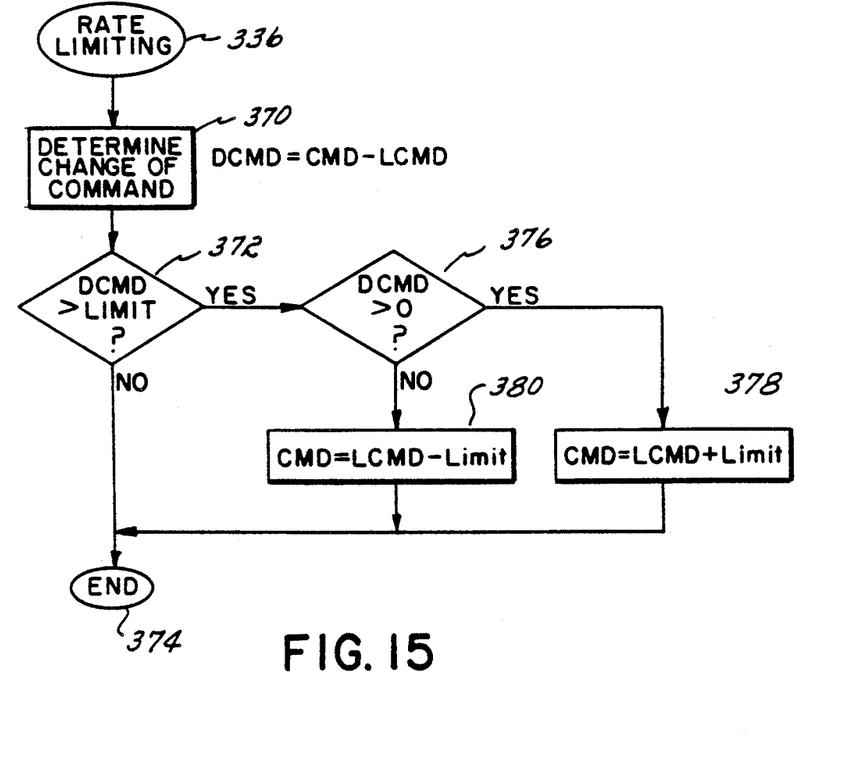

Thereafter, at step 332 the new value for CMD is set equal to the sum of PCMD and ICMD followed by the rate limiting procedure of FIG. 15 (step 336). The rate limiting procedure is utilized to limit the magnitude of changes of C-STR-CMD from spatial clock period to spatial clock period so as to minimize the possibility of causing damage to the tape or the part being made or the machine during operation. Thereafter, the rate-limited value of CMD is output at step 338 to dual port memory 158 as C-STR-CMD for repeated use by servo I/O 126 at each 5 ms interrupt until the length SPAT CLK of tape has again been applied whereby to correct for tape displacement error in conjunction with temporally-clocked commanded control of the C-axis as described in connection with FIG. 8. The interpolation sequence then ends at step 340 which results in passing through return step 266 of FIG. 10 which branches processor 140 back to the endless-loop routine of FIG. 9.

Figure 14:
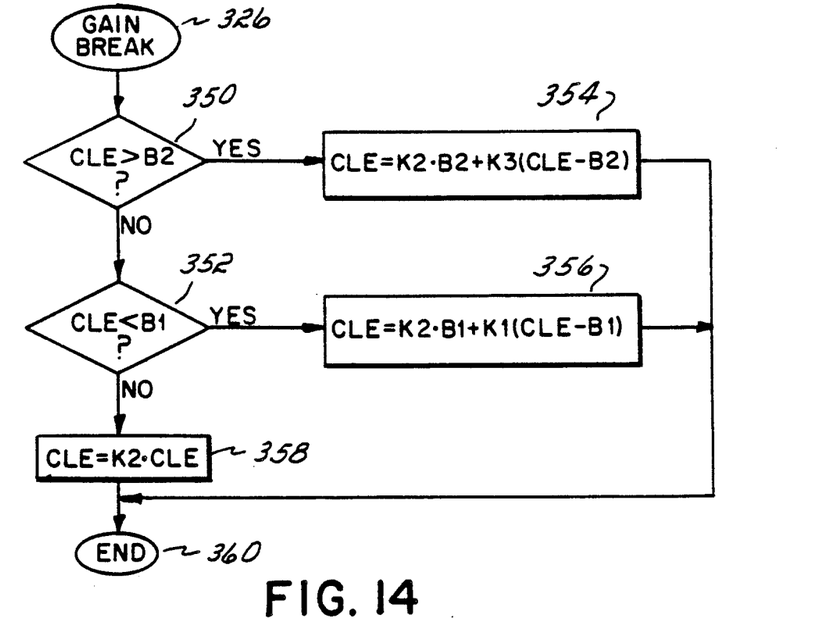

The gain break procedure of FIG. 14 proceeds from step 326 to steps 350 and 352 at which loop error (CLE) is compared to upper and lower rate limits B2 and B1, respectively. If the loop error is greater than rate limit B2 or less than rate limit B1, CLE is modified at step 354 or step 356, respectively, to reduce the gain of the system wherein if the loop error is within those limits, the gain may be made as large as practically possible at step 358 so as to stiffen response of the system to minor tape displacement errors before ending at step 360. In one embodiment, B2=0.015 inch and B1=−0.015 inch. To disable the gain break procedure, K1=K2=K3=1, although other and different values may be selected as desired for the response characteristics of the system.

With respect to the rate limiting procedure of FIG. 15 (step 336), the procedure continues to step 370 whereat the change of command (DCMD) between the present and prior spatial clock periods is determined (DCMD=CMD−LCMD). The procedure then continues to step 372 whereat DCMD is compared against a limit and if it does not exceed the limit, the procedure of FIG. 15 ends at step 374 and CMD is output at step 338 of FIG. 13 as C-STR-CMD as previously described. If, however, DCMD exceeds the limit at step 372, the procedure continues to step 376 to determine whether DCMD is positive. If so, DCMD is set equal to LCMD plus the limit at step 378 and if not, DCMD is set equal to the difference of LCMD and the limit at step 380. The updated CMD value is then available to be output as C-STR-CMD at step 338 of FIG. 13 as previously described. The limit is selected such that, based upon changes in C-STR-CMD, tape head 28 is not over-rotated such as to interfere with proper tape application or to damage tape 46 or web 48. To disable this feature, the limit may be set equal to a value sufficiently large, such as 10 degrees, that such a change in displacement error should not occur during a normal tape application procedure.

In operation, the various axes of motion, including the C-axis, are caused to move so as to move tape head 28 along a machine path relative layup tool 52 whereupon tape 46 is applied therealong. The movement is effected on a temporal basis in response to new CMD INCR values generated by servo supervisor 124 every 5 ms. At each 5 ms interrupt interval, the length of tape applied since the last displacement error correction factor C-STR-CMD was generated is computed and if it has exceeded the spatial clock period (SPAT CLK), a new C-STR-CMD is generated to be utilized by servo I/O 126 in responding to periodic CMD INCR values such that tape head 28 will be rotated in a direction to reduce displacement of the tape relative to the machine path as the next length of the tape course is being applied by tape head 28 along the machine path.

While the present invention has been illustrated by description of a preferred embodiment, and while the preferred embodiment has been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of Applicant's general inventive concept.

What is claimed is:

1. A method of applying substantially inelastic tape to a surface by means of a program controlled tape laying apparatus including a head assembly carrying an application member and a supply of the tape, the application member applying tape to the surface along a machine path, the head assembly being rotatable about an axis through the application member and intersecting the machine path, the method comprising:
applying tape to the surface by dispensing tape from the supply while effecting relative movement between the application member and the surface along the machine path;
determining lateral displacement of the tape relative to the machine path occurring upon application of a predetermined length of the tape to the surface; and
rotating the head assembly about said axis of rotation in response to determining lateral displacement of the tape relative to the machine path, the rotation being in a direction to result in reduced displacement of the tape relative to the machine path during continued application of the tape to the surface.

2. The method of claim 1 wherein the tape laying apparatus includes a control processor unit and a master processor unit in electronic communication with the control processor unit, the method further comprising:
with the control processor unit, collecting tape data related to lateral displacement of the tape from the machine path and controlling rotation of the tape head in response to a correction factor related to the lateral displacement; and
with the master processor unit, determining the lateral displacement from the tape data collected by the control processor unit and generating the correction factor to be used by the control processor unit in controlling rotation of the tape head.

3. The method of claim 1 wherein determining lateral displacement of the tape relative to the machine path occurring upon application of a predetermined length of tape to the surface comprises:
measuring longitudinal advance of the tape being applied to the surface at selected time intervals;
measuring lateral displacement of the tape relative to the machine path at the selected time intervals; and
interpolating to determine the lateral displacement of the tape relative the machine path occurring upon application of the predetermined length of tape to the surface from the longitudinal advance and lateral displacement measured at the selected time intervals.

4. The method of claim 3 wherein the tape laying apparatus includes a control processor unit and a master processor unit in electronic communication with the control processor unit, the method further comprising:
with the control processor unit, collecting tape data related to lateral displacement of the tape from the machine path and controlling rotation of the tape head in response to a correction factor related to the lateral displacement; and
with the master processor unit, determining the lateral displacement from the tape data collected by the control processor unit and generating the correction factor to be used by the control processor unit in controlling rotation of the tape head.

5. The method of claim 4 further comprising collecting, with the control processor unit, data from the tape related to longitudinal advance of the tape.

6. The method of claim 1 further comprising measuring longitudinal advance of the tape being applied to the surface whereby to determine that application of the predetermined length of tape to the surface has occurred.

7. The method of claim 1, wherein determining lateral displacement includes sensing change in position of an edge of the tape as it is applied to the surface, the lateral displacement of the tape relative to the machine path corresponding to said change in tape edge position.

8. The method of claim 1, the tape being supported on a web extending between the supply and a takeup member, and wherein determining lateral displacement includes sensing change in position of an edge of the web as the tape is applied to the surface, the lateral displacement of the tape relative to the machine path corresponding to said change in web edge position.

9. A programmed controlled tape laying apparatus for applying substantially inelastic tape to a surface along a machine path comprising:
   a rotatable head assembly including means to support a supply of the tape;
   application means carried by said head assembly for applying the tape to the surface;
   drive means for effecting relative movement between said application means and the surface along the machine path while applying the tape to the surface;
   first control means for determining lateral displacement of the tape relative to the machine path occurring upon application of a predetermined length of tape to the surface; and
   second control means responsive to said first control means for rotating said head assembly about an axis through said application means and intersecting the machine path in a direction to result in reduced displacement of the tape relative to the machine path during continued application of the tape to the surface.

10. The apparatus of claim 9, said first control means including:
   means for measuring longitudinal advance of the tape being applied to the surface at selected time intervals;
   means for measuring lateral displacement of the tape relative to the machine path at the selected time intervals; and
   means for interpolating to determine the lateral displacement occurring upon application of the predetermined length of tape to the surface from the longitudinal advance and lateral displacement measured at the selected time intervals.

11. The apparatus of claim 9 further comprising means to which said first control means is responsive for measuring longitudinal advance of the tape being applied to the surface whereby to determine that application of the predetermined length of tape to the surface has occurred.

12. The apparatus of claim 9 further comprising
   means for sensing change in position of an edge of the tape as it is applied to the surface, the lateral displacement of the tape relative to the machine path corresponding to said change in tape edge position.

13. The apparatus of claim 9 further comprising:
   means for taking up a web upon which the tape is supported for transport from the supply to said application means; and
   means carried by said head assembly for sensing change in position of at least one edge of the web as the tape is applied to the surface, the lateral displacement of the tape relative to the machine path corresponding to the change in web edge position.

14. The apparatus of claim 13, said sensing means including at least one LVDT by which the edge of the web passes, said LVDT being positioned to respond to the change in web edge position.

15. A programmed controlled tape laying apparatus for applying substantially inelastic tape to a surface along a machine path comprising:
   a rotatable head assembly including means to support a supply of the tape;
   application means carried by said head assembly for applying the tape to the surface;
   drive means for effecting relative movement between said application means and the surface along the machine path while applying the tape to the surface;
   control processor means for collecting tape data related to lateral displacement of the tape relative to the machine path and for controlling rotation of said head assembly about an axis through said application means and intersecting the machine path;
   master processor means in electronic communication with said control processor means for determining, from the tape data, lateral displacement of the tape relative to the machine path occurring upon application of a predetermined length of tape to the surface and generating a correction factor related thereto, said control processor means being responsive to the correction factor to rotate said head assembly in a direction to result in reduced displacement of the tape relative to the machine path during continued application of the tape to the surface.

16. The apparatus of claim 15, said control processor means including:
   means for collecting tape data related to longitudinal advance of the tape.

17. The apparatus of claim 16, said control processor means collecting tape data at selected time intervals, said master processor means including interpolation means for determining the lateral displacement occurring upon application of the predetermined length of tape to the surface from the tape data related to longitudinal advance and lateral displacement collected at the selected time intervals.

18. The apparatus of claim 15 further comprising sensor means carried by said head assembly for generating a signal indicative of lateral displacement of the tape relative to the machine path, said control processor means being responsive to said sensor means.

19. The apparatus of claim 15 further comprising:
   means for taking up a web upon which the tape is supported for transport from the supply to said application means; and
   means carried by said head assembly for sensing change in position of at least one edge of the web as the tape is applied to the surface, the lateral displacement of the tape relative to the machine path corresponding to the change in web edge position, said control processor means being responsive to said sensing means.

20. The apparatus of claim 19, said sensing means including at least one LVDT by which the edge of the web passes, said LVDT being positioned to respond to the change in web edge position.

* * * * *